United States Patent
Chen et al.

(10) Patent No.: US 11,425,680 B2
(45) Date of Patent: Aug. 23, 2022

(54) POSITIONING SYSTEM, POSITIONING SIGNAL GENERATION AND SENDING METHOD, AND STORAGE MEDIUM

(71) Applicant: ZTE CORPORATION, Shenzhen (CN)

(72) Inventors: Shijun Chen, Shenzhen (CN); Dawei Chen, Shenzhen (CN); Yuanyuan Wang, Shenzhen (CN); Cheng Bi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/262,695

(22) PCT Filed: Sep. 29, 2018

(86) PCT No.: PCT/CN2018/108864
§ 371 (c)(1),
(2) Date: Jan. 22, 2021

(87) PCT Pub. No.: WO2020/019518
PCT Pub. Date: Jan. 30, 2020

(65) Prior Publication Data
US 2021/0168756 A1   Jun. 3, 2021

(30) Foreign Application Priority Data
Jul. 23, 2018   (CN) .......................... 201810810609.3

(51) Int. Cl.
*H04W 64/00* (2009.01)
*H04W 4/029* (2018.01)
(Continued)

(52) U.S. Cl.
CPC ......... *H04W 64/006* (2013.01); *H04W 4/025* (2013.01); *H04W 4/029* (2018.02); *H04W 72/0446* (2013.01); *H04W 72/0453* (2013.01)

(58) Field of Classification Search
CPC ... H04W 64/006; H04W 4/025; H04W 4/029; H04W 72/0446; H04W 72/0453;
(Continued)

(56) References Cited

U.S. PATENT DOCUMENTS 9,119,165 B2 *   8/2015   Krasner ................... G01S 19/11
9,813,877 B1 *  11/2017   Chrabieh .............. H04W 64/00
(Continued)

FOREIGN PATENT DOCUMENTS

CN   101594336 A   12/2009
CN   101931857 A   12/2010
(Continued)

OTHER PUBLICATIONS

International Search Report for PCT/CN2018/108864 dated Apr. 28, 2019.

*Primary Examiner* — Siu M Lee
(74) *Attorney, Agent, or Firm* — Knobbe, Martens, Olson & Bear, LLP

(57) ABSTRACT

Disclosed is a positioning system. The positioning system includes a positioning signal generation server and a positioning station. The positioning signal generation server is configured to generate a time domain positioning oversampled signal according to a positioning signal parameter and send the time domain positioning oversampled signal to the positioning station. The positioning station is configured to receive the time domain positioning oversampled signal generated by the positioning signal generation server and send the time domain positioning oversampled signal according to sending time information of a positioning
(Continued)

signal. Further provided are a positioning signal generation and sending method and a storage medium.

18 Claims, 4 Drawing Sheets

(51) Int. Cl.
*H04W 4/02* (2018.01)
*H04W 72/04* (2009.01)

(58) Field of Classification Search
CPC . H04W 64/00; H04W 64/003; H04W 72/044; G01S 5/02; G01S 5/10; G01S 11/02
See application file for complete search history.

(56) References Cited

U.S. PATENT DOCUMENTS

| | | | |
|---|---|---|---|
| 2002/0019239 A1* | 2/2002 | Kasapidis | H04W 64/00 455/456.5 |
| 2013/0120188 A1* | 5/2013 | Pattabiraman | H04W 72/0446 342/357.29 |
| 2015/0219750 A1 | 8/2015 | Xiao et al. | |

FOREIGN PATENT DOCUMENTS

| | | |
|---|---|---|
| CN | 104038961 A | 9/2014 |
| CN | 106304328 A | 1/2017 |

* cited by examiner

POSITIONING SYSTEM, POSITIONING SIGNAL GENERATION AND SENDING METHOD, AND STORAGE MEDIUM

CROSS-REFERENCE TO RELATED APPLICATIONS

This is a National Stage Application, filed under 35 U.S.C. 371, of and claims priority to International Patent Application No. PCT/CN2018/108864, filed on Sep. 29, 2018, which claims priority to Chinese Patent Application No. 201810810609.3 filed on Jul. 23, 2018, the disclosures of which are incorporated herein by reference in their entireties.

TECHNICAL FIELD

The present disclosure relates to, but is not limited to, the field of positioning and, in particular, to a positioning system, a positioning signal generation and sending method, and a storage medium.

BACKGROUND

In long term evolution (LTE) technologies, a positioning reference signal (PRS) defined by a standard is introduced to perform a measurement on the position of a receiving side. The receiving side may accurately measure the position of the receiving side by using the positioning reference signal sent from a positioning base station side, and the structure diagram of a general radio communication system is shown in FIG. 1. Fifth-generation (5G) has higher accuracy and delay requirements for the positioning technology, so that the observed time difference of arrival (OTDOA) technology is used in 5G to improve the accuracy of positioning.

The OTDOA positioning method is a method that a serving cell (with the communication range covered by a communication base station providing communication functions for users) or a receiving node (a terminal) itself determines the position based on the measurement performed at the receiving node. The measurement at the receiving node reflects distances between the receiving node and at least two neighboring cells, coordinates of the neighboring cells are known to the communication base station of the current serving cell, generally the number of neighboring cells used in the OTDOA positioning is greater than 4, so that the number of positioning base stations is generally about four times more than the number of communication base stations.

Since a station needs complex coding calculations to achieve the positioning function, a high-performance chip is required to be set to meet the computing power for achieving the positioning function on the station (such as a positioning base station or a communication base station), and thus the cost is relatively high. In order to satisfy the positioning requirements in the related technology, a large number of positioning base stations or communication base stations with high-performance chips need to be set to achieve the positioning function, so that the system complexity and deployment cost of the positioning system increase.

SUMMARY

In view of the above description, the present disclosure provides a positioning system, a positioning signal generation and sending method and a storage medium to solve that a large number of positioning base stations or communication base stations with high-performance chips need to be set to achieve the positioning function, causing the increased system complexity and deployment cost of the positioning system.

In an embodiment, the present disclosure provides a positioning system. The positioning system includes a positioning signal generation server and a positioning station. The positioning signal generation server is configured to generate a time domain positioning oversampled signal according to a positioning signal parameter and send the time domain positioning oversampled signal to the positioning station. The positioning station is configured to receive the generated time domain positioning oversampled signal and send the time domain positioning oversampled signal according to sending time information of a positioning signal.

The positioning signal parameter may include at least one of: a positioning signal identity (ID), a time-frequency resource position of the positioning signal, a sending period of the positioning signal, or a number of times of continuously sending the positioning signal.

The step in which the positioning signal generation server generates the time domain positioning oversampled signal according to the positioning signal parameter may include steps described below. A positioning frequency domain signal sequence $X_K$ is generated according to the positioning signal parameter; where $K \in (0, \text{FFTSIZE}-1)$, and FFTSIZE is a preset number of Fourier transform points; and the time domain positioning oversampled signal $Z(i)$ is generated according to the positioning frequency domain signal sequence and a preset oversampling multiple G.

The step of generating the time domain positioning oversampled signal $Z(i)$ according to the positioning frequency domain signal sequence and a preset oversampling multiple G may include a step described below.

The time domain positioning oversampled signal $Z(i)$ is calculated according to the following formula:

$$Z(i)=y(m*ts),$$

in a case where $$t = m*ts, \quad y(t) = \sum_{K=0}^{FFTSIZE-1} X_K e^{j\omega_K *t};$$

where K is a serial number of a subcarrier, $$m = \left(n + \frac{\gamma}{G}\right), \quad ts = \frac{2\pi}{\omega_0 * FFTSIZE};$$

$\omega_0$ is a minimum angular velocity of a subcarrier, $$n = \left\lfloor \frac{i}{G} \right\rfloor,$$

$n \in [0, \text{FFTSIZE}-1]$; $\gamma = i \mod G$, $\gamma \in [0, G-1]$; and $\omega_K = \omega_0 * K$; where n is a serial number of an element in a positioning time domain signal sequence, $\gamma$ is a serial number of oversampled data between two adjacent elements in the positioning time domain signal sequence; and $\omega_K$ is an angular velocity of a subcarrier K.

The sending time information of the positioning signal may at least include a symbol time set sent by the time domain positioning oversampled signal.

The positioning system may further include a positioning-communication integration station. The positioning-communication integration station is configured to: receive the time domain positioning oversampled signal generated by the positioning signal generation server, superpose, according to the sending time information of the positioning signal, the time domain positioning oversampled signal on a wireless communication signal, and send the superposed signal.

The step in which the positioning system superposes, according to the sending time information of the positioning signal, the time domain positioning oversampled signal on a wireless communication signal and sends the superposed signal may include: in a case where current time does not belong to the symbol time set, sending the wireless communication signal; in a case where current time belongs to the symbol time set, superposing the time domain positioning oversampled signal on the wireless communication signal and sending the superposed signal.

The step in which the positioning station sends the time domain positioning oversampled signal may include steps described below, the positioning station converts the time domain positioning oversampled signal from a digital signal to an analog signal and sends the analog signal through a radio frequency link.

The positioning signal generation server may be further configured to set the positioning signal parameter and the sending time information of the positioning signal.

In an embodiment, the present disclosure provides a positioning signal generation and sending method. The positioning signal generation and sending method includes steps describe below, a positioning signal generation server generates a time domain positioning oversampled signal according to a positioning signal parameter and sends the time domain positioning oversampled signal to a positioning station; and the positioning station receives the generated time domain positioning oversampled signal and sends, according to sending time information of a positioning signal, the time domain positioning oversampled signal to a terminal for requesting a positioning function.

The step in which the positioning signal generation server generates the time domain positioning oversampled signal according to the positioning signal parameter may include steps described below, a positioning frequency domain signal sequence $X_K$ is generated according to the positioning signal parameter; where $K \in (0, FFTSIZE-1)$, and FFTSIZE is a preset number of Fourier transform points; and the time domain positioning oversampled signal $Z(i)$ is generated according to the positioning frequency domain signal sequence and a preset oversampling multiple G.

The step in which the time domain positioning oversampled signal $Z(i)$ is generated according to the positioning frequency domain signal sequence and the preset oversampling multiple G may include that the time domain positioning oversampled signal $Z(i)$ is generated according to the following formula:

$Z(i)=y(m*ts)$, in a case where $$t = m*ts, \; y(t) = \sum_{K=0}^{FFTSIZE-1} X_K e^{j\omega_K *t};$$

where K is a serial number of a subcarrier, $$m = \left(n + \frac{\gamma}{G}\right), \; ts = \frac{2\pi}{\omega_0 * FFTSIZE},$$

$\omega_0$ is a minimum angular velocity of a subcarrier, $$n = \left\lfloor \frac{i}{G} \right\rfloor,$$

$n \in [0, FFTSIZE-1]$; $\gamma = i \bmod G$, $\gamma \in [0, G-1]$; and $\omega_0 *K$; where n is a serial number of an element in a positioning time domain signal sequence, $\gamma$ is a serial number of oversampled data between two adjacent elements in the positioning time domain signal sequence; and $\omega_K$ is an angular velocity of a subcarrier K.

The sending time information of the positioning signal may at least include a symbol time set sent by the time domain positioning oversampled signal.

The positioning signal generation and sending method may further include steps described below, the positioning signal generation server generates the time domain positioning oversampled signal according to the positioning signal parameter and sends the time domain positioning oversampled signal to a positioning-communication integration station; and the positioning station receives the time domain positioning oversampled signal generated by the positioning signal generation server and sends, according to the sending time information of the positioning signal, the time domain positioning oversampled signal to the terminal requesting for the positioning function.

The step in which the time domain positioning oversampled signal is superposed on a wireless communication signal according to the sending time information of the positioning signal, and the superposed signal is sent to the terminal for requesting the positioning function may include a step described below, in a case where current time does not belong to the symbol time set, the wireless communication signal is sent to the terminal for requesting the positioning function; in a case where current time belongs to the symbol time set, the time domain positioning oversampled signal is superposed on the wireless communication signal and the superposed signal is sent to the terminal for requesting the positioning function.

Before the positioning signal generation server generates the time domain positioning oversampled signal according to the positioning signal parameter, the positioning signal generation and sending method may further include a step that the positioning signal parameter and the sending time information of the positioning signal are set.

The present disclosure further provides a positioning system. The positioning system includes a memory and a processor.

The memory is configured to store a program for generating and sending a positioning signal.

The processor is configured to execute the program; where the program, when executed, performs the positioning signal generation and sending method provided by the embodiments of the present disclosure.

The present disclosure further discloses a storage medium. The storage medium includes a stored program; where the program, when executed, performs the positioning signal generation and sending method provided by the embodiments of the present disclosure.

In the present disclosure, the positioning signal generation server pre-generates the time domain positioning oversampled signal and sends the time domain positioning oversampled signal to the positioning station, so that the positioning station does not need to pay attention to the generation process of the time domain positioning oversampled signal and only needs to send the received time domain positioning oversampled signal when the positioning function is turned on, thereby decreasing the system complexity of the positioning station and reducing the deployment cost of the positioning station.

DETAILED DESCRIPTION

To solve that a large number of high-performance chips need to be set on the positioning base stations, causing the increased system complexity and deployment cost of positioning stations, the present disclosure provides a positioning system, a positioning generation and sending method and a storage medium. The present disclosure is further described below in detail in conjunction with drawings and embodiments. It should be understood that the embodiments described herein are intended to explain the present disclosure but not to limit the present disclosure.

Figure 1:
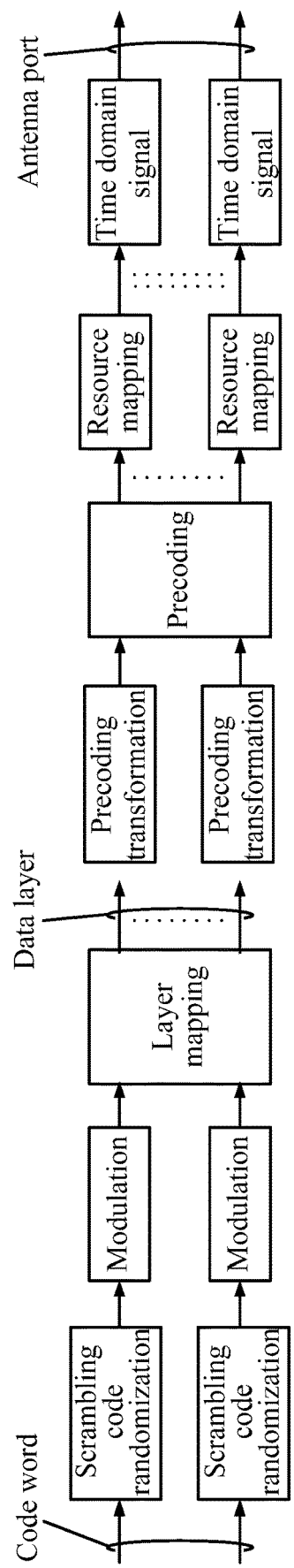
FIG. 1 is a structure diagram of a wireless communication system in the related art.
Figure 2:
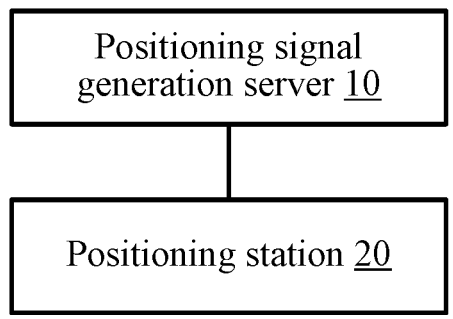
FIG. 2 is an architecture diagram of a positioning system according to an embodiment of the present disclosure.

The embodiments of the present disclosure provide a positioning system. The architecture diagram of the positioning system is shown in FIG. 2. The positioning system mainly includes a positioning signal generation server 10 and a positioning station 20. The positioning signal generation server 10 is configured to generate a time domain positioning oversampled signal according to a positioning signal parameter and send the time domain positioning oversampled signal to a communication base station. The positioning station 10 is configured to receive the time domain positioning oversampled signal generated by the positioning signal generation server and send the time domain positioning oversampled signal according to sending time information of a positioning signal.

It should be understood that when the positioning system provided by the present embodiment is used in a wireless communication system network, one single positioning signal generation server 10 may be disposed in the network, a plurality of positioning stations 20 may be connected to the positioning signal generation server 10, and the positioning signal generation server 10 may be disposed at any one of the positioning stations 20 connected thereto, or may be disposed at a background center (for example, a dispatch center, a monitoring center, etc.). The positioning signal generation server 10 and the positioning stations 20 may communicate through a wireless network. The positioning stations 20 may be base stations that implement a positioning function, servers that may send the time domain positioning oversampled signal to outside, and so on.

In the embodiment, the positioning signal parameter is mainly used to generate the time domain positioning oversampled signal. Contents of the positioning signal parameter include at least one of: a positioning signal identity (ID), a time-frequency resource position of the positioning signal, a sending period of the positioning signal, or a number of times of continuously sending the positioning signal, and may further include some commonly used parameters such as a sampling rate, a preset oversampling multiple, or a number of Fourier transform points.

Before generating the time domain positioning oversampled signal according to the positioning signal parameter, the positioning signal generation server 10 may set configuration parameters such as the positioning signal parameter and the sending time information of the positioning signal, and the above-mentioned configuration process may be a case of receiving configuration from a developer, or may be the automatic configuration of the positioning signal generation server 10 according to actual situations. It should be understood that the setting of values of the above-mentioned parameters in actual use may be dynamically adjusted according to actual situations and is not described in detail herein. The positioning signal is the time domain positioning oversampled signal, the positioning signal ID refers to an ID of the time domain positioning oversampled signal, and a value of the ID of the time domain positioning oversampled signal may be generated according to a preset numbering rule, such as generated according to a sequential order or generated according to current time. The sending period of the positioning signal, the number of times of continuously sending the positioning signal, the time-frequency resource position of the positioning signal and the like are all configuration parameters commonly used when the time domain positioning oversampled signal is generated or sent. The sending time information of the positioning signal, which is also referred to as a subframe offset number, is actually used to indicate on which subframe of a current wireless frame the positioning station 20 sends the corresponding time domain positioning oversampled signal.

In an embodiment, when generating the time domain positioning oversampled signal according to the positioning signal parameter, the positioning signal generation server 10 firstly generates a positioning frequency domain signal sequence $X_K$ according to the positioning signal parameter. K refers to a serial number of each element in the positioning frequency domain signal sequence, i.e., a serial number of a subcarrier, and $K \in (0, \text{FFTSIZE}-1)$. FFTSIZE is a preset number of Fourier transform points and is generally set to be 2048. After the positioning frequency domain signal sequence $X_K$ is generated, the positioning signal generation server 10 generates the time domain positioning oversampled signal $Z(i)$ according to the positioning frequency domain signal sequence $X_K$ and a preset oversampling multiple G. The preset oversampling multiple is generally set to be 16 and may be adjusted according to actual situations.

In an embodiment, the positioning signal generation server 10 calculates the time domain positioning oversampled signal Z(i) according to the following formula:

$$Z(i)=y(m*ts),$$

in a case where $$t = m*ts, \ y(t) = \sum_{K=0}^{FFTSIZE-1} X_K e^{j\omega_K * t};$$

where K is a serial number of a subcarrier, $$m = \left(n + \frac{\gamma}{G}\right), \ ts = \frac{2\pi}{\omega_0 * FFTSIZE};$$

$\omega_0$ is a minimum angular velocity of a subcarrier, $$n = \left\lfloor \frac{i}{G} \right\rfloor,$$

n ∈[0, FFTSIZE−1]; γ=i mod G, γ∈[0, G−1]; and $\omega_K=\omega_0*K$; where n is a serial number of an element in a positioning time domain signal sequence, γ is a serial number of oversampled data between two adjacent elements in the positioning time domain signal sequence; and $\omega_K$ is an angular velocity of a subcarrier K.

After generating the time domain positioning oversampled signal Z(i), the positioning signal generation server 10 sends the time domain positioning oversampled signal Z(i) together with the sending time information of the positioning signal to the corresponding positioning station 20. In an embodiment, the positioning signal generation server 10 sends the time domain positioning oversampled signal to the positioning station 20 before the positioning station 20 provides the positioning function service.

Correspondingly, the positioning station 20 receives and stores the time domain positioning oversampled signal before providing the positioning function service. The positioning station 20 turns on the positioning function, when a user uses a terminal to request positioning within the service range of the positioning station 20, and the positioning station 20 sends the time domain positioning oversampled signal on a fixed subframe of a wireless frame according to the sending time information of the positioning signal. In the present embodiment, the positioning station 20 only needs to send the time domain positioning oversampled signal according to the sending time information of the positioning signal, and high-performance calculation modules such as a coding module of the positioning signal, a Fourier transformation module of the positioning signal, an oversampling module of the positioning signal and the like are not needed to be installed in the positioning station 20, so that the system complexity of the base station is greatly decreased and the deployment cost of the base station is reduced.

Figure 3:
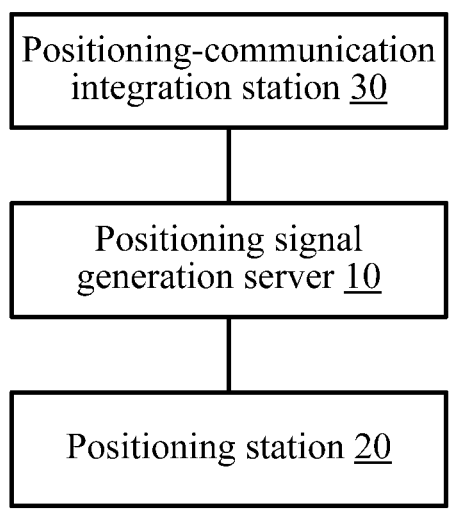
FIG. 3 is an architecture diagram of another positioning system according to an embodiment of the present disclosure.

In an embodiment, the positioning system may further include a positioning-communication integration station 30, and the architecture diagram of the positioning system is shown in FIG. 3. The positioning-communication integration station 30 is also a kind of positioning station. The positioning-communication integration station 30 has the function of sending the time domain positioning oversampled signal and sending a wireless communication signal for achieving a communication function at the same time. Therefore, after receiving the time domain positioning oversampled signal generated by the positioning signal generation server, the positioning-communication integration station 30 superposes the time domain positioning oversampled signal on the wireless communication signal and sends the superposed signal to the user terminal, so that the communication function and the positioning function can be simultaneously satisfied. In an embodiment, in a case where current time does not belong to a symbol time set included in the sending time information of the positioning signal, the positioning-communication integration station 30 only sends the wireless communication signal; in a case where the current time belongs to the symbol time set, the positioning-communication integration station 30 superposes the time domain positioning oversampled signal on the wireless communication signal and sends the superposed signal. That is:

$$S^a(i) = \begin{cases} Z(i) + D^a(i), \ i \in [0, \ FFTSIZE*G-1], \\ a \in \{\text{the symbol time set of the positioning signal}\} \\ D^a(i), \ a \notin \{\text{the symbol time set of the positioning signal}\} \end{cases}$$

$S^a(i)$ is a signal actually sent by the positioning-communication integration station 30, and D(i) is an oversampled wireless communication signal of the positioning-communication integration station 30.

In addition, when the positioning station 20 sends the time domain positioning oversampled signal and/or the positioning-communication integration station 30 sends the superposed signal, each signal is firstly converted from a digital signal to an analog signal through a digital to analog (D/A) converter, and then the analog signal is sent to the corresponding terminal for requesting the positioning function through a radio frequency link.

In the embodiments of the present disclosure, the positioning signal generation server pre-generates the time domain positioning oversampled signal and sends the time domain positioning oversampled signal to the positioning station, so that the positioning station does not need to pay attention to the generation process of the time domain positioning oversampled signal and only needs to send the received time domain positioning oversampled signal when the positioning function is turned on, thereby decreasing the system complexity of the positioning system and reducing the deployment cost of the positioning system.

Figure 4:
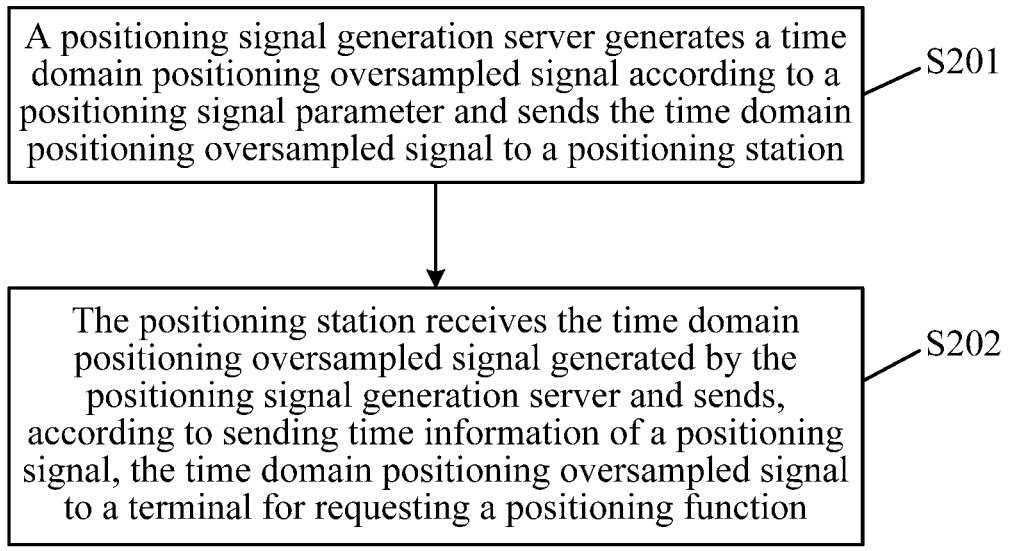
FIG. 4 is a flowchart of a signal generation and sending method according to an embodiment of the present disclosure.

The embodiments of the present disclosure provide a positioning signal generation and sending method, which is mainly applied to a communication system architecture with a positioning system. The flowchart is shown in FIG. 4, and the method mainly includes steps S201 and S202.

In step S201, a positioning signal generation server generates a time domain positioning oversampled signal according to a positioning signal parameter and sends the time domain positioning oversampled signal to a positioning station.

In step S202, the positioning station receives the time domain positioning oversampled signal generated by the positioning signal generation server and sends the time domain positioning oversampled signal to a terminal for requesting a positioning function according to sending time information of a positioning signal.

It should be understood that in the communication system network of the present embodiment, one positioning signal generation server may be disposed, a plurality of positioning stations may be connected to the positioning signal generation server, and the positioning signal generation server may be disposed at any one of the positioning stations connected thereto, or may be disposed at a background center. The positioning signal generation server and the positioning stations may communicate with each other through a wireless network.

In the present embodiment, the positioning signal parameter is mainly used to generate the time domain positioning oversampled signal. Contents of the positioning signal parameter include at least one of: a positioning signal identity (ID), a time-frequency resource position of the positioning signal, a sending period of the positioning signal, or a number of times of continuously sending the positioning signal, and may further include some commonly used parameters such as a sampling rate, a preset oversampling multiple, and a number of Fourier transform points.

Before the time domain positioning oversampled signal is generated according to the positioning signal parameter, configuration parameters such as the positioning signal parameter and the sending time information of the positioning signal may be set on the positioning signal generation server, and the above-mentioned configuration process may be achieved through manual configuration of a developer or through the automatic configuration of the positioning signal generation server according to actual situations. It should be understood that the setting of values of the above-mentioned parameters in actual use may be dynamically adjusted according to actual situations and is not described in detail herein. The positioning signal ID refers to an ID of the time domain positioning oversampled signal, and a value of the ID of the time domain positioning oversampled signal may be generated according to a preset numbering rule, such as generated according to a sequential order or generated according to current time. The sending period of the positioning signal, the number of times of continuously sending the positioning signal, the time-frequency resource position of the positioning signal and the like are all configuration parameters commonly used when the time domain positioning oversampled signal is generated or sent. The sending time information of the positioning signal, which is also referred to as a subframe offset number, is actually used to indicate on which subframe of the current wireless frame the communication base station sends the corresponding time domain positioning oversampled signal.

In an embodiment, when the time domain positioning oversampled signal is generated according to the positioning signal parameter, the positioning signal generation server firstly generates a positioning frequency domain signal sequence $X_K$ according to the positioning signal parameter. K refers to a serial number of each element in the positioning frequency domain signal sequence, i.e., a serial number of a subcarrier, and K $\in$(0, FFTSIZE−1). FFTSIZE is a preset number of Fourier transform points and is generally set to be 2048. After the positioning frequency domain signal sequence $X_K$ is generated, the positioning signal generation server generates the time domain positioning oversampled signal Z(i) according to the positioning frequency domain signal sequence $X_K$ and a preset oversampling multiple G. The preset oversampling multiple is generally set to be 16 and may be adjusted according to actual situations.

In an embodiment, the positioning signal generation server calculates the time domain positioning oversampled signal Z(i) according to the following formula:

$$Z(i)=y(m*ts),$$

in a case where $$t = m*ts, \ y(t) = \sum_{K=0}^{FFTSIZE-1} X_K e^{j\omega_K *t};$$

where K is a serial number of a subcarrier, $$m = \left(n + \frac{\gamma}{G}\right), ts = \frac{2\pi}{\omega_0 * FFTSIZE};$$

$\omega_0$ is a minimum angular velocity of a subcarrier, $$n = \left\lfloor \frac{i}{G} \right\rfloor,$$

n $\in$[0, FFTSIZE−1]; γ=i mod G, γ$\in$[0, G−1]; and $\omega_K=\omega_0*$K; where n is a serial number of an element in a positioning time domain signal sequence, γ is a serial number of oversampled data between two adjacent elements in the positioning time domain signal sequence; and $\omega_K$ is an angular velocity of a subcarrier K.

After generating the time domain positioning oversampled signal Z(i), the positioning signal generation server sends the time domain positioning oversampled signal Z(i) together with the sending time information of the positioning signal to the corresponding positioning station. In an embodiment, the positioning signal generation server sends the time domain positioning oversampled signal to the positioning station before the positioning station provides the positioning function service, so as to ensure that the positioning signal can be directly sent in a case of the positioning station turning on the positioning function.

Correspondingly, the positioning station receives and stores the time domain positioning oversampled signal before providing the positioning function service. The positioning station turns on the positioning function when a user uses a terminal to request positioning within the service range of the positioning station, and the positioning station sends the time domain positioning oversampled signal on a fixed subframe of a wireless frame to the terminal for requesting the positioning function according to the sending time information of the positioning signal. In an embodiment, the positioning station only needs to send the time domain positioning oversampled signal according to the sending time information of the positioning signal, and high-performance calculation modules such as a coding module for the positioning signal, a Fourier transformation module for the positioning signal, an oversampling module for the positioning signal and the like are not needed to be installed in the positioning station, so that the system complexity of the base station is greatly decreased and the deployment cost of the base station is reduced.

In an embodiment, the current communication architecture may further include a positioning-communication integration station. The positioning-communication integration station is also a kind of positioning station. The positioning signal generation server generates and sends the time domain positioning oversampled signal to the positioning-communication integration station. The positioning-communication integration station sends the time domain positioning oversampled signal and a wireless communication signal for achieving a communication function at the same time. The positioning-communication integration station superposes the time domain positioning oversampled signal on the wireless communication signal and sends the superposed signal to the user terminal, so that the communication function and the positioning function can be simultaneously satisfied. According to the sending time information of the positioning signal issued by the positioning signal generation server, in a case where current time does not belong to a symbol time set included in the sending time information of the positioning signal, the positioning-communication integration station 30 only sends the wireless communication signal; in a case where the current time belongs to the symbol time set, the positioning-communication integration station 30 superposes the time domain positioning oversampled signal on the wireless communication signal and sends the superposed signal. That is:

$$S^a(i) = \begin{cases} Z(i) + D^a(i), i \in [0, FFTSIZE * G - 1], \\ a \in \{\text{the symbol time set of the positioning signal}\} \\ D^a(i), a \notin \{\text{the symbol time set of the positioning signal}\} \end{cases}$$

$S^a(i)$ is a signal actually sent by the positioning-communication integration station, and $D(i)$ is an oversampled wireless communication signal of the positioning-communication integration station.

In addition, when the positioning station sends the time domain positioning oversampled signal and/or the positioning-communication integration station sends the superposed signal, each signal is firstly converted from a digital signal to an analog signal through a D/A converter, and then the analog signal is sent to the corresponding terminal for requesting the positioning function through a radio frequency link in the communication base station.

In the embodiment, the positioning signal generation server pre-generates the time domain positioning oversampled signal and sends the time domain positioning oversampled signal to the positioning station, so that the positioning station does not need to pay attention to the generation process of the time domain positioning oversampled signal and only needs to send the received time domain positioning oversampled signal when the positioning function is turned on, and thereby the system complexity of the positioning station is decreased and the deployment cost of the positioning station is reduced.

Figure 5:
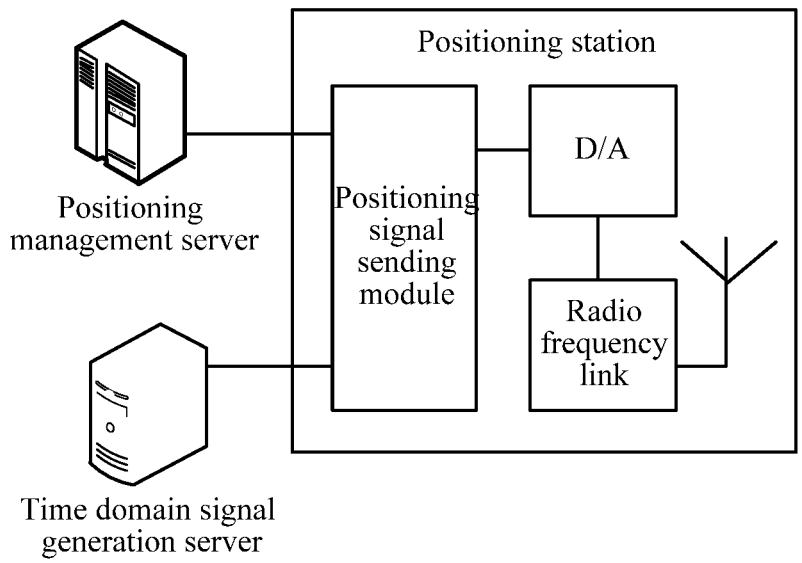
FIG. 5 is a system structural diagram of a communication system according to an embodiment of the present disclosure.
Figure 6:
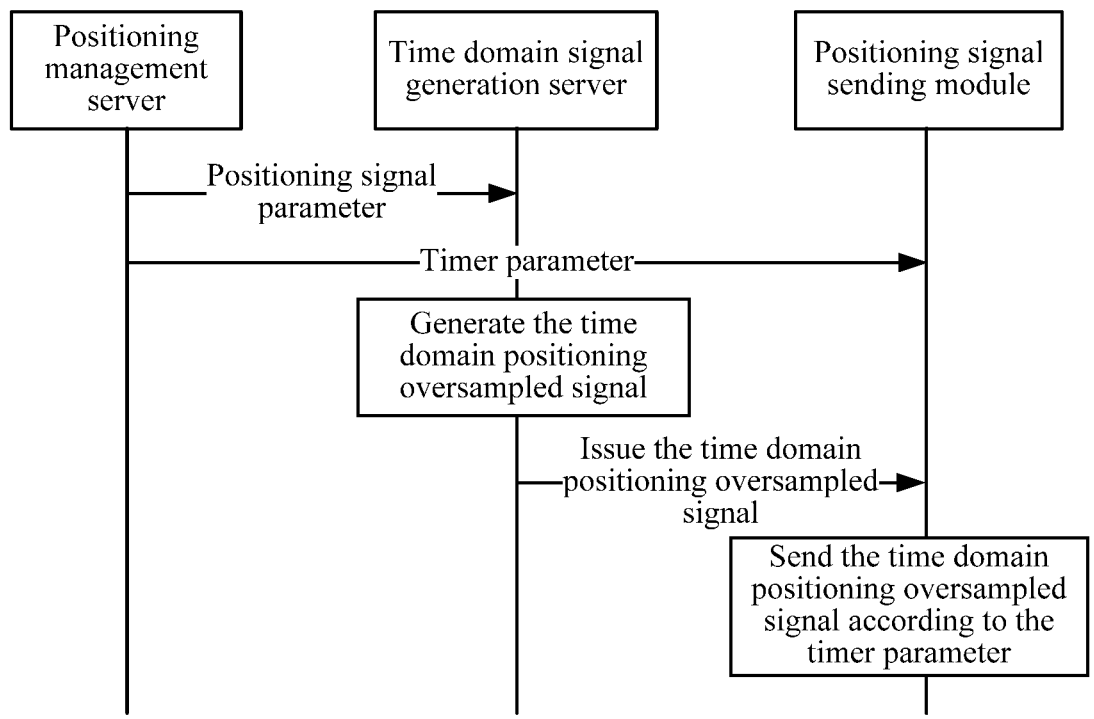
FIG. 6 is a flowchart of a communication system implementing a positioning function according to an embodiment of the present disclosure.

The embodiments of the present disclosure provide a communication system. The system structural diagram is shown in FIG. 5. The communication system mainly includes: a positioning management server, a time domain signal generation server (the positioning management server and the time domain signal generation server are equivalent to the positioning signal generation server in the embodiments of the present disclosure) and a positioning base station (equivalent to the positioning station in the embodiments of the present disclosure). A positioning signal sending module, a D/A converter and a radio frequency link are installed in the positioning base station. The flowchart of implementing the positioning function by using the above-mentioned communication system is shown in FIG. 6.

The positioning management server is mainly used to configure a PRS parameter and a timer parameter (equivalent to the sending time information of the positioning signal in the embodiments of the present disclosure). The positioning signal parameter includes: Nrb=100, TPRS=10 ms, Nprs=1, fs=30.72 MHz, G=16, and FFTSize=2048; where Nrb is a number of allocated resources, TPRS is the period of the PRS, Nprs is a number of consecutive subframes, fs is a sampling rate, G is an oversampling multiple, and FFTSize is a number of Fourier transform points. The PRS is sent on $3^{rd}$, $5^{th}$, $6^{th}$, $8^{th}$, $9^{th}$, $10^{th}$, $12^{th}$, and $13^{th}$ symbols in a subframe. The timer parameter includes: $\Delta$ PRS=3, where $\Delta$ PRS is the subframe offset number, that is, the positioning signal is configured to be sent on the third subframe of each wireless frame within 10 ms. After configuring the above-mentioned parameters, the positioning management server sends the corresponding positioning signal parameter to the time domain signal generation server and issues the timer parameter to the positioning signal sending module in each positioning base station.

After the time domain signal generation server receives the positioning signal parameter issued by the positioning management server, for each symbol sending the PRS, an initial value Ninit of a pseudo-random sequence (equivalent to the positioning frequency domain signal sequence $X_K$ in the embodiments of the present disclosure) is firstly generated according to the value of the positioning signal parameter and in combination with basic attributes of the time domain positioning oversampled signal (such as a slot serial number, a symbol index, a cyclic prefix (CP) type and other information), and a sequence with a length of 400 is further generated. After a quadrature phase shift keying (QPSK) is performed on Ninit, according to a PRS mapping relationship, Ninit subjected to the QPSK is mapped to a time-frequency resource grid to perform an inverse fast Fourier transform (IFFT) of 2048 points to obtain time domain data of one symbol, and oversampling is performed on the time domain data. After the same processing is performed on each symbol of the time domain positioning oversampled signal, time domain data having continuous time, i.e., the time domain positioning oversampled signal Z(i), is obtained. After generating the time domain positioning oversampled signal, the time domain signal generation server sends the time domain positioning oversampled signal to each positioning base station before the positioning base station turns on the positioning function.

After respectively receiving the timer parameter sent by the positioning management server and the time domain positioning oversampled signal sent by the time domain signal generation server, the positioning signal sending module in the positioning base station saves the timer parameter and the time domain positioning oversampled signal locally; and after the positioning base station turns on the positioning function, the positioning signal sending module sends the time domain positioning oversampled signal on the third subframe of each wireless frame according to the timer parameter. During sending, the time domain positioning oversampled signal is firstly converted from a digital signal to an analog signal through the D/A converter, and the converted analog signal is sent to the terminal for requesting the positioning function through the radio frequency link.

Figure 7:
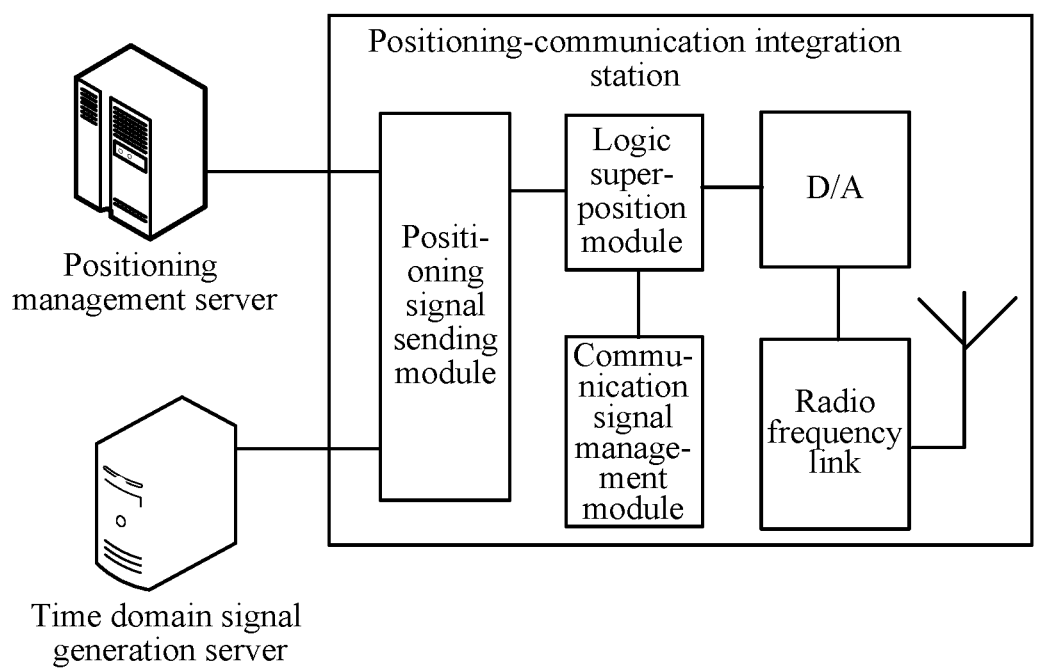
FIG. 7 is a system structural diagram of another communication system according to an embodiment of the present disclosure.

In addition, in the communication system provided by the embodiment, the positioning base station may further be replaced with a positioning-communication integration base station. At this time, the structural diagram of the communication system is shown in FIG. 7. Besides the positioning signal sending module, the D/A converter and the radio frequency link, the positioning-communication integration base station further includes a communication signal management module and a logic superposition module.

The positioning signal sending module in the positioning-communication integration base station respectively receives the timer parameter sent by the positioning management server and the time domain positioning oversampled signal sent by the time domain signal generation server and saves them locally. Then, after the positioning function is turned on, when sending the third subframe of each wireless frame according to the timer parameter, the positioning signal sending module superposes the time domain positioning oversampled signal on the wireless communication signal generated by the communication signal management module through the logic superposition module and sends the superposed signal. When sending subframes of the wireless frame other than the third subframe, the positioning signal sending module only sends the wireless communication signal.

In the embodiment, the positioning management server sends the positioning signal parameter and the timer parameter, the time domain signal generation server pre-generates the time domain positioning oversampled signal, so that the positioning base station does not need to pay attention to the generation process of the time domain positioning oversampled signal and only needs to send the received time domain positioning oversampled signal when the positioning function is turned on, and thereby the system complexity of the base station is decreased and the deployment cost of the positioning base station is reduced.

Although the preferred embodiments of the present disclosure have been disclosed for illustrative purposes, those skilled in the art will appreciate that various modifications, additions and substitutions are possible, and accordingly, the scope of the present disclosure should not be limited to the embodiments set forth above.

What is claimed is:

1. A positioning system, comprising:
a positioning signal generation server, which is configured to generate a time domain positioning oversampled signal according to a positioning signal parameter and send the time domain positioning oversampled signal to a positioning station; and
the positioning station, which is configured to receive the generated time domain positioning oversampled signal and send the time domain positioning oversampled signal according to sending time information of a positioning signal.

2. The positioning system according to claim 1, wherein the positioning signal parameter comprises at least one of: a positioning signal identity (ID), a time-frequency resource position of the positioning signal, a sending period of the positioning signal, or a number of times of continuously sending the positioning signal.

3. The positioning system according to claim 1, wherein the positioning signal generation server is further configured to:
generate a positioning frequency domain signal sequence $X_K$ according to the positioning signal parameter; wherein $K \in (0, FFTSIZE-1)$, and FFTSIZE is a preset number of Fourier transform points; and
generate the time domain positioning oversampled signal $Z(i)$ according to the positioning frequency domain signal sequence and a preset oversampling multiple G.

4. The positioning system according to claim 3, wherein the positioning signal generation server is further configured to calculate the time domain positioning oversampled signal $Z(i)$ according to the following formula:

$$Z(i)=y(m*ts),$$

in a case where $$t = m*ts, \ y(t) = \sum_{K=0}^{FFTSIZE-1} X_K e^{j\omega_K *t};$$

where K is a serial number of a subcarrier, $$m = \left(n + \frac{\gamma}{G}\right), \ ts = \frac{2\pi}{\omega_0 * FFTSIZE};$$

$\omega_0$ is a minimum angular velocity of a subcarrier, $$n = \left\lfloor \frac{i}{G} \right\rfloor,$$

$n \in [0, FFTSIZE-1]$; $\gamma = i \bmod G$, $\gamma \in [0, G-1]$; and $\omega_K = \omega_0 * K$; where n is a serial number of an element in a positioning time domain signal sequence, $\gamma$ is a serial number of oversampled data between two adjacent elements in the positioning time domain signal sequence; and $\omega_K$ is an angular velocity of a subcarrier K.

5. The positioning system according to claim 1, wherein the sending time information of the positioning signal comprises: a symbol time set sent by the time domain positioning oversampled signal.

6. The positioning system according to claim 5, further comprising:
a positioning-communication integration station, which is configured to: receive the time domain positioning oversampled signal generated by the positioning signal generation server, superpose, according to the sending time information of the positioning signal, the time domain positioning oversampled signal on a wireless communication signal, and send the superposed signal.

7. The positioning system according to claim 6, wherein the positioning-communication integration station is further configured to:
in a case where current time does not belong to the symbol time set, send the wireless communication signal;
in a case where current time belongs to the symbol time set, superpose the time domain positioning oversampled signal on the wireless communication signal and send the superposed signal.

8. The positioning system according to claim 1, wherein the positioning station is further configured to:
convert the time domain positioning oversampled signal from a digital signal to an analog signal; and
send the analog signal through a radio frequency link.

9. The positioning system according to claim 1, wherein the positioning signal generation server is further configured to set the positioning signal parameter and the sending time information of the positioning signal.

10. A positioning signal generation and sending method, comprising:
generating, by a positioning signal generation server, a time domain positioning oversampled signal according to a positioning signal parameter, and sending the time domain positioning oversampled signal to a positioning station; and
receiving, by the positioning station, the generated time domain positioning oversampled signal, and sending, according to sending time information of a positioning signal, the time domain positioning oversampled signal to a terminal for requesting a positioning function.

11. The method according to claim 10, wherein the generating, by the positioning signal generation server, the time domain positioning oversampled signal according to the positioning signal parameter comprises:
generate a positioning frequency domain signal sequence $X_K$ according to the positioning signal parameter; wherein $K \in (0, \text{FFTSIZE}-1)$, and FFTSIZE is a preset number of Fourier transform points; and
generating the time domain positioning oversampled signal $Z(i)$ according to the positioning frequency domain signal sequence and a preset oversampling multiple G.

12. The method according to claim 11, wherein the generating the time domain positioning oversampled signal $Z(i)$ according to the positioning frequency domain signal sequence and the preset oversampling multiple G comprises:
calculating the time domain positioning oversampled signal $Z(i)$ according to the following formula:
$$Z(i)=y(m*ts),$$
in a case where $$t = m*ts, \quad y(t) = \sum_{K=0}^{FFTSIZE-1} X_K e^{j\omega_K * t};$$

where K is a serial number of a subcarrier, $$m = \left(n + \frac{\gamma}{G}\right), \quad ts = \frac{2\pi}{\omega_0 * FFTSIZE},$$

$\omega_0$ is a minimum angular velocity of a subcarrier, $$n = \left\lfloor \frac{i}{G} \right\rfloor,$$

$n \in [0, \text{FFTSIZE}-1]$; $\gamma=i \bmod G$, $\gamma \in [0, G-1]$; and $\omega_K=\omega_0 * K$; where n is a serial number of an element in a positioning time domain signal sequence, $\gamma$ is a serial number of oversampled data between two adjacent elements in the positioning time domain signal sequence; and $\omega_K$ is an angular velocity of a subcarrier K.

13. The method according to claim 10, wherein the sending time information of the positioning signal comprises: a symbol time set sent by the time domain positioning oversampled signal.

14. The method according to claim 13, further comprising:
generating, by the positioning signal generation server, the time domain positioning oversampled signal according to the positioning signal parameter, and sending the time domain positioning oversampled signal to a positioning-communication integration station; and
receiving, by the positioning-communication integration station, the time domain positioning oversampled signal generated by the positioning signal generation server, superposing, according to the sending time information of the positioning signal, the time domain positioning oversampled signal on a wireless communication signal, and sending the superposed signal to the terminal for requesting the positioning function.

15. The method according to claim 14, wherein the superposing, according to the sending time information of the positioning signal, the time domain positioning oversampled signal on the wireless communication signal, and the sending the superposed signal to the terminal for requesting the positioning function comprise:
in a case where current time does not belong to the symbol time set, sending the wireless communication signal to the terminal for requesting the positioning function;
in a case where current time belongs to the symbol time set, superposing the time domain positioning oversampled signal on the wireless communication signal and sending the superposed signal to the terminal for requesting the positioning function.

16. The method according to claim 10, before the generating, by the positioning signal generation server, the time domain positioning oversampled signal according to the positioning signal parameter, further comprising:
setting the positioning signal parameter and the sending time information of the positioning signal.

17. A positioning system, comprising:
a memory, which is configured to store a program for generating and sending a positioning signal; and
a processor, which is configured to execute the program; wherein the program, when executed, performs the positioning signal generation and sending method of claim 10.

18. A non-transitory storage medium, comprising a stored program; wherein the program, when executed, performs the positioning signal generation and sending method of claim 10.

* * * * *

UNITED STATES PATENT AND TRADEMARK OFFICE
CERTIFICATE OF CORRECTION

PATENT NO. : 11,425,680 B2
APPLICATION NO. : 17/262695
DATED : August 23, 2022
INVENTOR(S) : Chen et al.

It is certified that error appears in the above-identified patent and that said Letters Patent is hereby corrected as shown below:

In the Specification

In Column 4, Line 12, delete "$\omega_0$" and insert --$\omega_K=\omega_0$--.

In Column 4, Line 16, delete "$co_K$" and insert --$\omega_K$--.

In Column 12, Lines 23-39, delete "(CP) type and other information), and a sequence with a length of 400 is further generated. After a quadrature phase shift keying (QPSK) is performed on Ninit, according to a PRS mapping relationship, Ninit subjected to the QPSK is mapped to a time-frequency resource grid to perform an inverse fast Fourier transform (IFFT) of 2048 points to obtain time domain data of one symbol, and oversampling is performed on the time domain data. After the same processing is performed on each symbol of the time domain positioning oversampled signal, time domain data having continuous time, i.e., the time domain positioning oversampled signal Z(i), is obtained. After generating the time domain positioning oversampled signal, the time domain signal generation server sends the time domain positioning oversampled signal to each positioning base station before the positioning base station turns on the positioning function." and insert the same on Column 12, Line 22, as a continuation of the same paragraph.

In the Claims

In Column 14, Claim 4, Line 8 (Approx.), delete "where" and insert --wherein--.

In Column 14, Claim 4, Line 22, delete "where" and insert --wherein--.

In Column 15, Claim 11, Line 7, delete "generate" and insert --generating--.

In Column 15, Claim 12, Line 28 (Approx.), delete "where" and insert --wherein--.

In Column 15, Claim 12, Line 41 (Approx.), delete "where" and insert --wherein--.

Signed and Sealed this
Twenty-first Day of February, 2023

*Katherine Kelly Vidal*

Katherine Kelly Vidal
*Director of the United States Patent and Trademark Office*